July 28, 1959     J. SIPPEL ET AL     2,896,556
APPARATUS FOR CONTINUOUS MIXING OF FLOUR AND WATER
(OR OTHER INGREDIENTS) IN THE MAKING OF
DOUGH OR BATTER OR THE LIKE Filed Nov. 21, 1956     2 Sheets-Sheet 1

INVENTORS
GERHARDT J. SIPPEL
JOHN SIPPEL
BY
ATTORNEY.

United States Patent Office 2,896,556
Patented July 28, 1959

2,896,556

APPARATUS FOR CONTINUOUS MIXING OF FLOUR AND WATER (OR OTHER INGREDIENTS) IN THE MAKING OF DOUGH OR BATTER OR THE LIKE

John Sippel and Gerhardt J. Sippel, Albertson, N.Y.

Application November 21, 1956, Serial No. 623,694

3 Claims. (Cl. 107—30)

This invention relates to apparatus for continuous mixing of flour and water (or other ingredients) in the making of dough or batter or the like.

The invention is not limited to the baking industry and may readily be applied to other food processing industries and analogous applications. For example, in the manufacture of various forms of confectionary, it is necessary to mix powdered solids with liquids of various viscosities. Powdered sugar would be a typical ingredient in such operations. The present invention is readily applicable to these operations. For purposes of illustration, however, the invention will herein be described solely in terms of mixing flour and water in the preparation of dough or batter used in baking processes. But this should not be construed as limiting the invention either in terms of the industry to which it is applicable or in terms of the ingredients to which it applies. Obviously, the invention would function equally as well with flour combined with other powdered ingredients such as powdered sugar or powdered eggs, and by the same token it would function just as well with other powdered materials. Similarly, the invention is equally suited to the use of liquids other than water, such as milk, or water combined with other ingredients or additives, such as yeast nutrients, vanilla extracts and the like.

Conventional flour and water mixing machines now in use in the baking industry are adapted to mix a limited batch of material at a time. Reference is here made not only to small bake shops operated by individuals but also to large commercial bakeries which process many tons of baked goods per day. Speaking generally, these conventional mixing machines consist of a container which may be of very large dimensions and a mixer mounted therein. A given quantity of flour is deposited in said container and an appropriate quantity of water is also introduced therein. The flour and water are mixed to produce a batch of dough or batter limited in quantity to the quantities of flour and water that were deposited in the container. Each batch of material must therefore be mixed individually and the required amounts must be calculated in advance lest a particular batch be insufficient or excessive in connection with the particular requirements of a given baking operation.

The principal object of this invention is the provision of a continuous mixing apparatus capable of producing a controlled continuous flow of mixed material. In this invention, the ingredients are also supplied in continuous manner in a metered flow. Thus, the flour is fed continuously in a constant flow at a controlled rate and this is equally true of the water. The flow of flour relative to water or water relative to flour may be varied at will in accordance with the consistency of the product which may be desired or required at any given time or for any given purpose. Similarly, the flow of both materials may be varied to produce greater or lesser quantities of the ultimate mixture without interrupting the continuity of the operation. But by the same token, should it be desired at any time to bring the operation to an end, this might be done quickly and readily by simply terminating the flow of materials at the appropriate moment. Equally important, the mixing process may very easily be resumed by merely resuming the flow of these materials.

In short, what is provided herein is a continuous apparatus for the continuous mixing of flour and water and any other materials which may favorably respond to this treatment.

Briefly stated, the invention comprises the following steps: Depositing the flour in a continuous, metered flow upon a continuous surface continuously wetted with water to form a continuous mixture of flour and water in the form of a relatively thin continuous layer and continuously removing said layer from said surface. Stated differently, the water and flour are applied in alternate layers upon a continuous surface and each layer of flour will immediately combine with the preceding layer of water to form the desired mixture.

The flour and water may be applied in the form of a spray to a continuously moving surface, the water preceding the flour in the sequence herein provided. Preferably, however, the flour is applied to said surface under considerable pressure so as to insure immediate and complete mixing with the water. This may be done by shooting the flour under pressure from a gun or nozzle having one or more orifices. Since relatively small quantities of material are employed at any given moment, an intimate mixture results, especially when the ingredients are combined under pressure.

The sequence of events or operations and their relative directions of movement may be varied within the broad principles of this invention. For example, it is immaterial whether the flour is deposited on the water or the water is applied to the flour. Nor does it matter whether the flour and water are applied at a fixed location to a continuously moving surface or whether the surface remains fixed and the flour and water are applied at continuously changing locations thereon.

Nor does the shape of said surface matter. It may be plane, conical or cylindrical or any other suitable shape. A plane surface may be provided in the form of a continuously moving belt or a continuously rotating turntable. Other variations are contemplated. The flour and water may each be applied to said surface in a single continuous flow or in a plurality of continuous flows. In the latter case, the flow of water would alternate with the flow of flour.

The object, as has above been stated, is to form an intimate mixture of flour and water or other ingredients in a thin continuous layer which may be removed as soon as it is formed. But it may be found desirable to apply one layer upon another before removing the same. For example, a continuous layer may be built up upon itself to a thickness of several such layers or any desired number before being removed from the surface on which they are formed. Since the material of which the mixture is formed is not sufficiently cohesive to retain its own shape or identity, depositing one layer upon another does not laminate the material but rather builds up its thickness to any desired extent. In the preferred form of this invention, however, only one layer is deposited at a time and it is removed as quickly as it is formed.

The invention is illustrated in the accompanying drawing in which.

Figure 1:
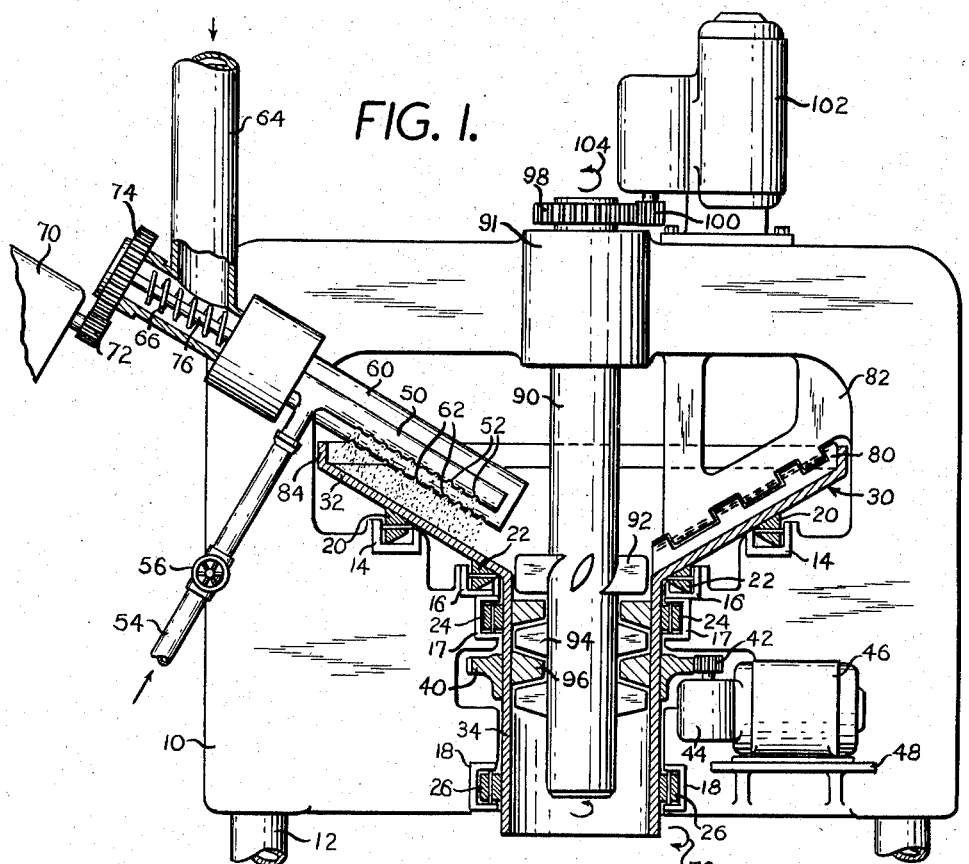
Fig. 1 is a front or side view of a mixing machine made in accordance with one form of this invention, the surface upon which mixing takes place being shown in the form of a truncated cone and being illustrated in vertical section.

Referring now to the first form of this invention and to Fig. 1 of the drawing, it will be observed a frame 10 is provided on suitable supports such as legs 12. A plurality of brackets 14, 16, 17, and 18 are provided on frame 10 and these brackets are adapted to support a corresponding number of bearings 20, 22, 24 and 26. Bearings 20 and 22 may be conical in shape as shown in the drawing and bearings 24 and 26 may be cylindrical as indicated in the drawing.

A generally conical or funnel-shaped member 30 is mounted for rotation about a vertical axis on these several bearings. The conical portion 32 of said funnel-shaped member 30 constitutes the mixing surface of the apparatus and it will be observed that it is supported on the conical bearings 20 and 22 which are adapted to rotate on horizontal axes. The cylindrical portion 34 of said funnel-shaped member 30 engages the cylindrical bearings 24 and 26 which rotate on vertical axes. It will be understood that this bearing arrangement is purely illustrative and it may be varied as desired in order to support the funnel-shaped member 30 for rotary movement about its major axis which extends on a vertical line.

A gear ring 40 is secured to the outside of said cylindrical portion 34 of the funnel-shaped member 30. Engaging said gear ring is a gear wheel 42 which is connected to a gear box 44 on electric motor 46. The gear box contains conventional speed reducing gears connected in conventional manner to the motor shaft and to the shaft on which the gear wheel 42 is mounted. The motor is itself supported on a bracket 48 secured to the frame 10. It will be observed from the foregoing, that the funnel-shaped member 30 may be caused to rotate about its vertical axis by means of motor 46 and the gear train which connects it to cylindrical portion 34 of the funnel-shaped member 30.

Situated above the conical portion 32 of the funnel-shaped member 30 is a water spray-head 50 which, in the illustrated form of the invention, is simply a pipe having a plurality of openings 52 formed therein. This pipe is supported in parallel relation to that portion of the conical surface 32 which happens to be situated below it at any given moment. This is not essential, but it is a convenient means of supporting the spray-head at all apertured points a uniform distance from the conical portion 32. A water pipe 54 is connected to said spray-head in conventional manner and a conventional valve is incorporated into said water pipe to control the flow of water therethrough.

Situated adjacent spray-head 50 and in parallel relation thereto is a second spray-head or powder gun 60 having a plurality of apertures 62 formed therein in facing relation to the conical surface 32. This spray-head or powder gun 60 may also be an elongated pipe with holes 62 as its nozzles or orifices. Connected to powder gun 60 is a pipe 64 which may extend downwardly to said powder gun from a conventional hopper. The hopper would, of course, contain flour or any other material which it is desired to mix with the water. By the same token, water pipe 54 may contain water, with or without additives, or any other fluid material which it is desired to combine with the flour or other material in the hopper.

Any conventional means for forcing the flour through the flour gun 60 and more particularly its orifices 62 may be employed. By way of illustration, a worm or screw feed 66 is provided and it is driven by an electric motor 70 with a speed reducing gear train operating through gear wheels 72 and 74 to drive the shaft 76 on which the feed screw is mounted. But this is purely illustrative of a relatively slow feed mechanism and it will be understood that any other feed means may be employed to deposit the flour on the conical surface 32 with such force and rate of speed as desired.

It will now be understood that the spray-head 50 and the flour gun 60 will deposit water and flour in that order upon the conical support 32 as said conical support is caused to rotate about its central vertical axis by means of motor 46. As viewed from the top, said conical support 32 rotates in clockwise direction. See the curved arrow 78 at the bottom of Fig. 1. A stationary scraper or doctor blade 80 is supported above the conical member 32 and in contact therewith. This scraper 80 may be hingedly supported on a bracket 82 which is secured to frame 10. If desired, the scraper may be spring-urged downwardly to hold it in engagement with the conical member 32 or it may be maintained in such engagement by gravity. It may be desirable to position said scraper at an angle relative to a radial line drawn from the center of said conical member 32. As the flour and water are deposited upon the rotating conical member 32 as above described, thereby mixing intimately with each other and forming a thin layer of such mixture on said conical member 32, the scraper will automatically scrape said layer off said conical member and, being biased as above mentioned, this would tend to direct the material downwardly and centrally of said conical member. An annular vertical wall or flange 84 is provided along the upper peripheral edge of said conical member 32 to prevent the material from being pushed off said conical member during this scraping operation.

It is necessary to prevent the mixed material from accumulating in the center of said conical member 32 and also to feed it through the cylindrical member 34 to the next stage or station in the operation. We are not concerned in the present application with said stage or station but merely with the means of moving the material through cylindrical member 34 and kneading it at the same time. Said means comprises a vertical shaft 90 which is journaled into a bearing element 91 at the top of frame 10, an impeller 92 secured to said shaft, a plurality of vanes 94 also secured to said shaft, and a plurality of annular walls 96 secured to the inside of said cylindrical member 34. Impeller 92 is situated at the point where the conical member 32 joins the cylindrical member 34. The annular walls 96 are situated below said impeller and in spaced relation to each other. The vanes 94 alternate with walls 96 and cooperate therewith for a kneading action. The upper end of shaft 90 is provided with a gear wheel 98 which meshes with a second gear wheel 100 connected to the reduction gears of reduction motor 102. As arrow 104 at the top of Fig. 1 indicates, the direction of rotation of shaft 90 is counter-clockwise as viewed from the top. It is immaterial in which direction said shaft rotates providing that it is in the opposite direction from the rotation of conical member 32 and its cylindrical extension 34.

As a layer of mixed water and flour is formed upon the conical member 32 and is scraped downwardly and inwardly therefrom by means of scraper 80, the mixture will eventually reach impeller 92 which will force it downwardly through the cylindrical member 34. But before the mixture passes through said cylinder, it is acted upon by vanes 94 which work the mixture in a kneading action. By the time the material is dispensed from the lower end of cylindrical member 34, it is not only thoroughly mixed but it is also thoroughly kneaded and is ready for the next stage or operation in the baking or other process.

Figure 2:
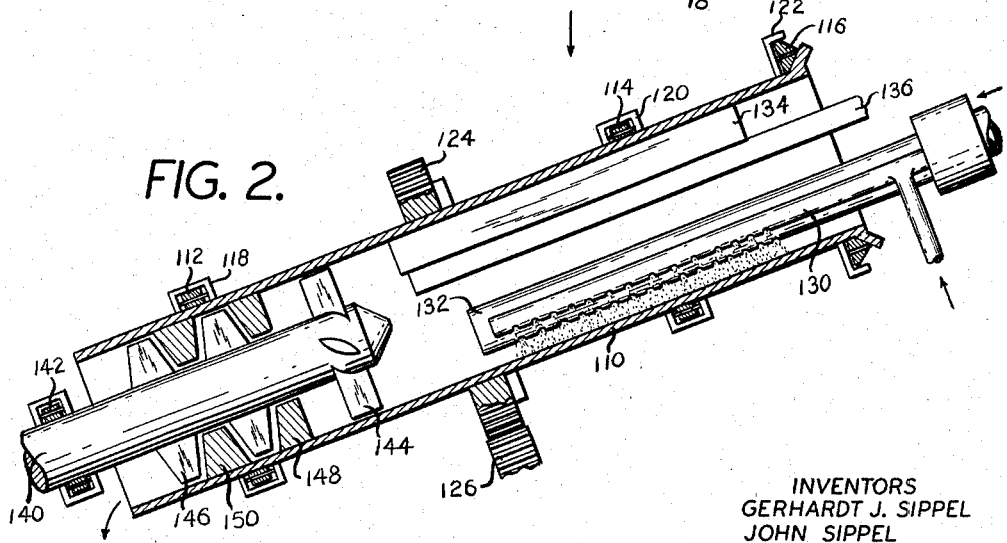
Fig. 2 is a longitudinal section through a mixing machine made in accordance with a second form of this invention, the mixing surface being cylindrical in shape.

Turning now to the second form of this invention and to Fig. 2, it will be observed that cylinder 110 provides the mixing surface. This cylinder is rotatably supported by means of bearings 112, 114 and 116 which themselves are supported in brackets 118, 120 and 122. A gear ring 124 is secured to said cylinder 110 on the outside thereof and it meshes with a gear wheel 126 which is driven by a reduction motor as shown in Fig. 1 in connection with motor 46. This causes the cylinder to rotate about its longitudinal axis. It will now be observed that said cylinder is disposed at an angle to the horizontal and the purpose of this is to provide a sloping support for the material being mixed to take advantage of the gravity flow resulting therefrom.

A water spray-head 130 and a flour gun 132 extend into said cylinder and they are provided with a source of supply of water and flour, respectively, under pressure. It is by this means that the water and flour may be deposited upon the inside of said cylinder 110. A scraper 134 is supported on a fixed bracket 136 within said cylinder and it engages the inner wall of the cylinder to scrape the flour and water mixture therefrom. This scraper may also be situated at an angle to facilitate and direct the downward movement of the removed material. While Fig. 2 shows the scraper situated at the top and the water spray-head and flour gun situated at the bottom, this relative arrangement may be varied and even reversed if desired.

At the lower end of cylinder 110 is shaft 140 which is supported by bearings 142 and other bearings coaxially with the cylinder and a reduction drive such as is shown in connection with shaft 90 is also connected to shaft 140 to cause it to rotate in the opposite direction from the direction of rotation of cylinder 110.

At the upper end of shaft 140 is an impeller 144. Below said impeller is a plurality of blades 146 which are spaced from said impeller and from each other. Annular walls 148 and 150 are secured to the inside of cylinder 110 in alternate relation to vanes 146. Impeller 144 performs the function of driving the flour and water mixture downwardly through the cylinder and vanes 146 and said annular walls 148 and 150 perform the function of kneading said mixture, all as above described in connection with the first form of this invention.

Figure 3:
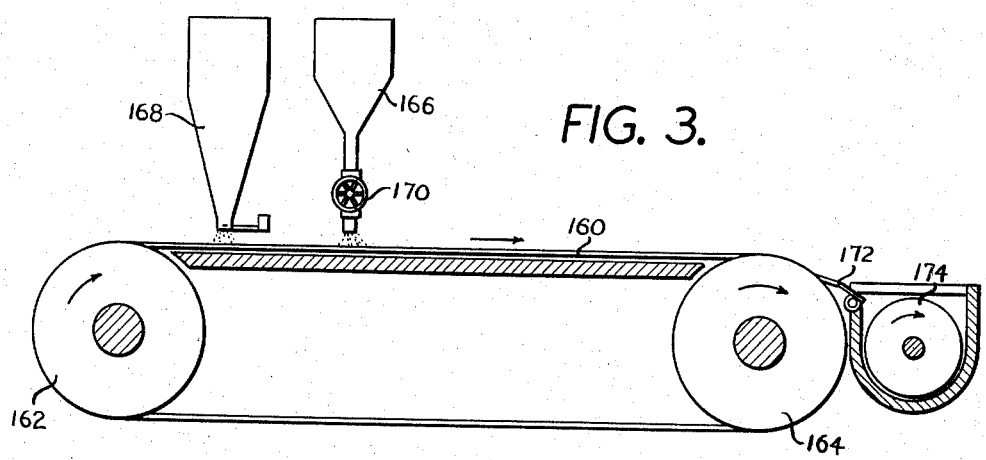
Fig. 3 is a front or side view of a mixing machine made in accordance with a third form of this invention wherein the mixing surface is provided on the upper run of a continuously moving belt.
Figure 4:
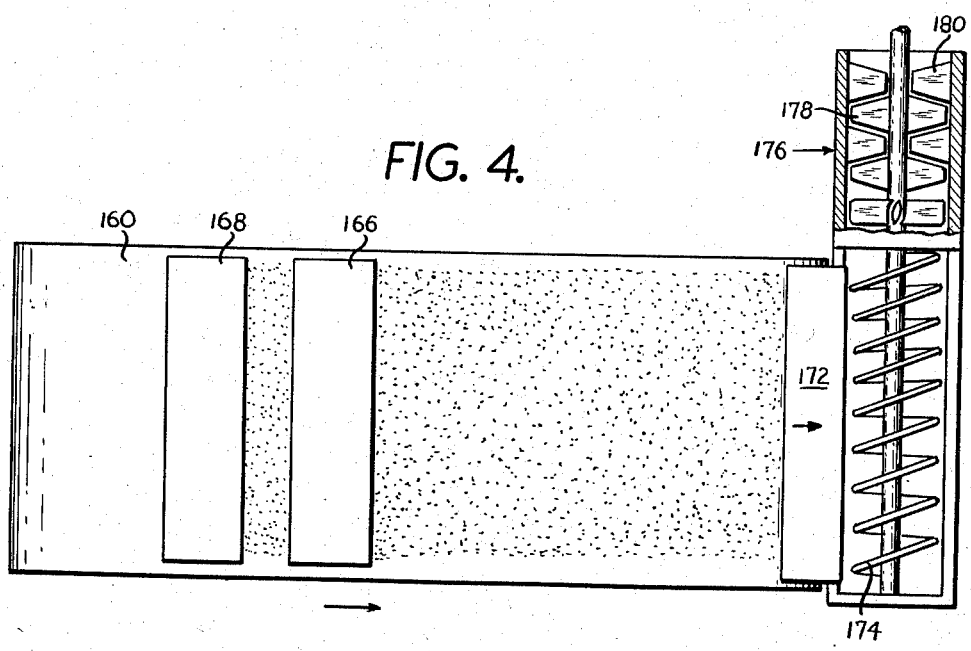
Fig. 4 is a plan view of the mixing machine shown in Fig. 3.

Referring now to the third form of this invention and to Fig. 3, it will be observed that the mixing surface is provided on the top run of an endless belt 160 which is mounted on rollers 162 and 164 respectively. One of these rollers is an idler and the other is motor driven by a reduction motor as above described in connection with funnel-shaped member 30 and cylindrical member 110. Above belt 160 is a spray-head 166 for water or other liquid and adjacent thereto is a powder gun 168 for flour or other material which is to be mixed with said liquid. The water may be permitted to flow by gravity onto the belt and a valve 170 is provided to control such flow. Flour may also be permitted to drop by gravity upon said belt 160 but it is preferred and sometimes essential that the flour be propelled upon the belt with considerable force so as to cause it to mix quickly and intimately with the water.

A layer of mixed material is thereby formed on the belt and it is carried to a scraper 172 which scrapes it off the belt. A feed screw 174 carries the material to a kneader 176 having vanes 178 cooperating with annular walls 180.

The foregoing is illustrative of preferred forms of this invention and it will be understood that these forms may be modified and other forms may be provided within the broad spirit of the invention and the broad scope of the claims.

We claim:

1. Apparatus for producing a mixture of a powder and a liquid, such as flour and water, comprising a continuously moving concavely curved receiving surface, means for continuously depositing said powder and said liquid on said receiving surface to form a mixture thereon in the form of a thin layer, scraping means for continuously removing said mixture from said receiving surface immediately upon its formation thereon, and kneading means for continuously kneading said removed mixture immediately upon its removal from said receiving surface.

2. Apparatus in accordance with claim 1, wherein the receiving surface is conical in shape, mounted for rotary movement.

3. Apparatus in accordance with claim 1, wherein the receiving surface is cylindrical in shape, mounted for rotary movement.

References Cited in the file of this patent

UNITED STATES PATENTS

| | | |
|---|---|---|
| 617,866 | Somasco | Jan. 17, 1899 |
| 774,680 | Lynds | Nov. 8, 1904 |
| 1,790,347 | Hawkins | Jan. 27, 1931 |
| 2,073,567 | Sciarra | Mar. 9, 1937 |
| 2,703,059 | Kaser | Mar. 1, 1955 |

FOREIGN PATENTS

| | | |
|---|---|---|
| 96,938 | Austria | May 10, 1924 |